Feb. 16, 1937.    M. A. MARTIN    2,071,133
BEVERAGE COOLING SYSTEM AND APPARATUS
Filed Feb. 20, 1935    2 Sheets-Sheet 1
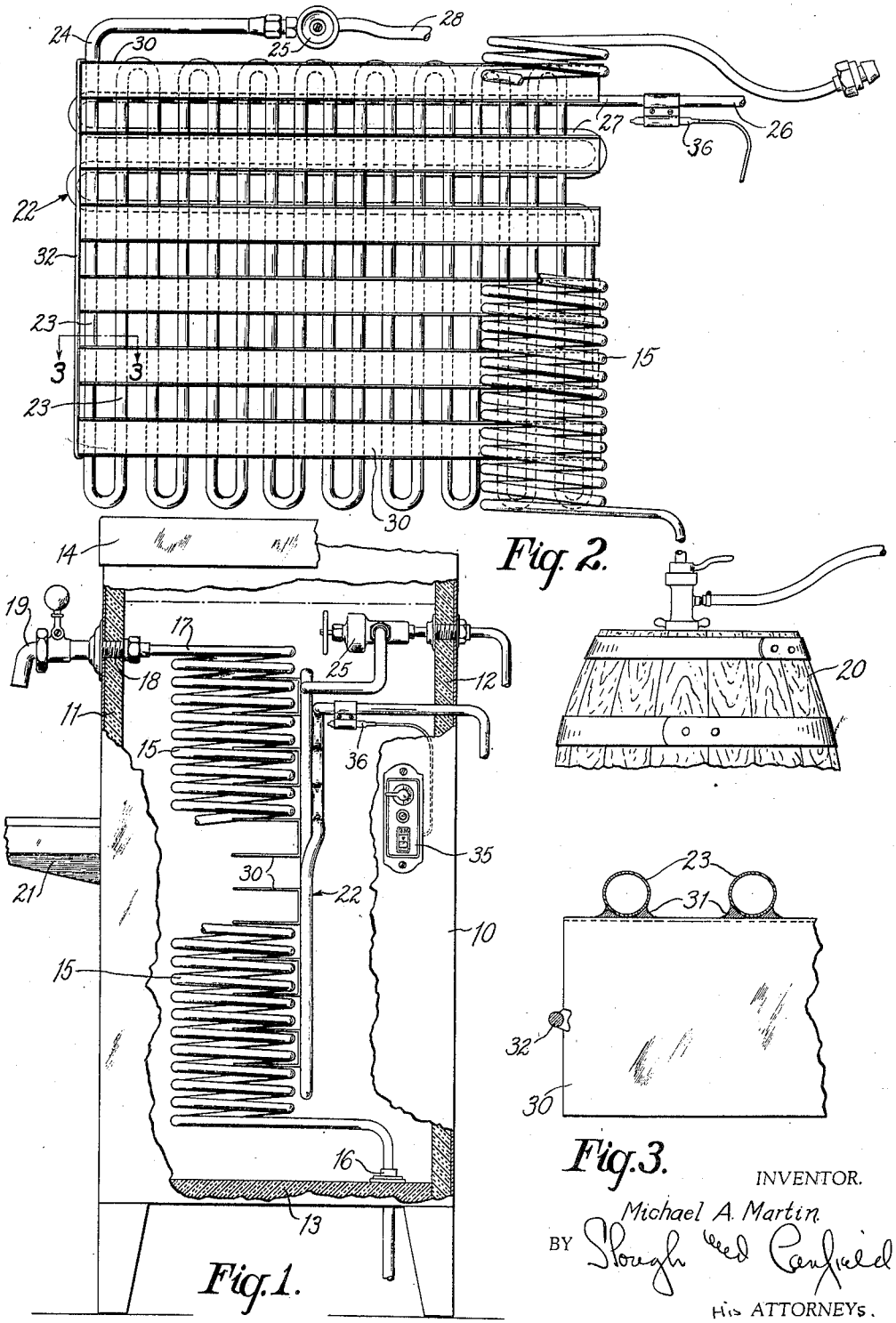
INVENTOR.
Michael A. Martin
BY Slough and Canfield
His ATTORNEYS.

INVENTOR.
Michael A. Martin.

Patented Feb. 16, 1937

2,071,133

UNITED STATES PATENT OFFICE 2,071,133

BEVERAGE COOLING SYSTEM AND APPARATUS

Michael A. Martin, Erie, Pa., assignor to Uniflow Mfg. Company, Erie, Pa., a corporation of Pennsylvania Application February 20, 1935, Serial No. 7,421

3 Claims. (Cl. 62—141)

This invention relates to beverage cooling and dispensing systems and apparatus, and more particularly relates to such a system and apparatus adapted to dispense beverage such as beer at the point of consumer use.

The quality of a beverage, particularly beer, is dependent upon the temperature at which it is dispensed and consumed. For example, the ideal temperature at which beer should be dispensed is generally accepted as varying from 40 to 45° Fahrenheit, resulting in a creamy and very palatable beer having a desired "head" or "collar". Beer at a higher temperature tastes flat and is relatively unpalatable, while beer at a lower temperature is too cold to be palatable and an insufficient amount of carbonic gas is liberated to give a desired "collar".

Irrespective of the quality of the beer, it is important that definite temperature limits be closely maintained to satisfy consumer demand.

Heretofore, beverage cooling and dispensing systems and apparatus have been provided, but wherein after an idle period the initial amount of beverage withdrawn was too cool, and at a later rapid rate of withdrawal the beverage was not sufficiently cooled in passing through the system, resulting in an excessively warm beverage.

These prior systems with which I am familiar have commonly employed ice packed around the beverage coils as the cooling medium, the cooling medium thus having a substantially constant temperature throughout approximating the freezing temperature of water. In such systems the temperature differential between the cooling fluid and a desired withdrawal temperature of the beverage or the heat exchange qualities of the cooling medium are not sufficiently flexible to permit a desired variation in the rate of withdrawal of the beverage and still maintain the proper consumption temperature of the beverage.

Additionally, the continual melting and periodic replacement of the ice and consequent exposure to room temperature results in a relatively uneconomical system requiring considerable attention particularly when charging the system after a period of disuse.

Other prior systems with which I am familiar have employed automatic refrigeration including a liquid cooling medium surrounding the beverage coils and agitating means for circulating cooling medium throughout the cabinet.

I have provided an improved beverage cooling and dispensing system and apparatus obviating the aforementioned disadvantages and wherein the beverage is dispensed at a substantially uniform predetermined temperature irrespective of the rate of withdrawal, and irrespective of the period intervening during which no beverage is withdrawn from the system.

It is a primary object of my invention, therefore, to provide an improved beverage cooling system and apparatus adapted to provide beverage at a substantially constant temperature.

Another object of my invention is to provide an improved beverage cooling system and apparatus adapted to provide beverage at a substantially constant temperature irrespective of the length of time intervening between withdrawal periods.

Another object of my invention is to provide an improved beverage cooling system and apparatus which may be easily adapted to a conventional packed ice refrigerated beverage cooler.

Another object of my invention is to provide an improved beverage cooling system and apparatus wherein the maximum heat exchange cooling the beverage is effected in the area within which the warm beverage enters the system.

Another object of my invention is to provide an improved beverage cooling system and apparatus provided with a circulating cooling medium and having sufficient storage capacity to maintain the beverage at a substantially desired cooling temperature over a normal break down period occasioned by interruption of the cooling medium circulation due to failure of the power circuit operating the cooling fluid condenser means.

Another object of my invention is to provide an improved beverage cooling system and apparatus having sufficient heat exchange storage capacity to maintain the beverage at a desired withdrawal temperature despite an abnormal rate of withdrawal.

Another object of my invention is to provide an improved automatic beverage cooling system and apparatus provided with means for controlling the temperature at which beverage is withdrawn from the system.

Another object of my invention is to provide an improved beverage cooling system and apparatus of the above type which is relatively economical of manufacture, installation, and operation.

Another object of my invention is to provide an improved beverage cooling system and apparatus of the above type provided with means for predetermining the temperature at which beverage will be withdrawn to accommodate the desires of the consumer and/or vender.

Other objects of my invention and the invention itself will become increasingly apparent from a consideration of the following description and drawings, wherein:

Fig. 1 is a fragmentary side elevational view, partially in section, of a preferred embodiment of my invention;

Fig. 2 is a front elevational view of a portion of the mechanism illustrated in Fig. 1;

Fig. 3 is an enlarged fragmentary sectional view taken along the line 3—3 of Fig. 2;

Figure 4:
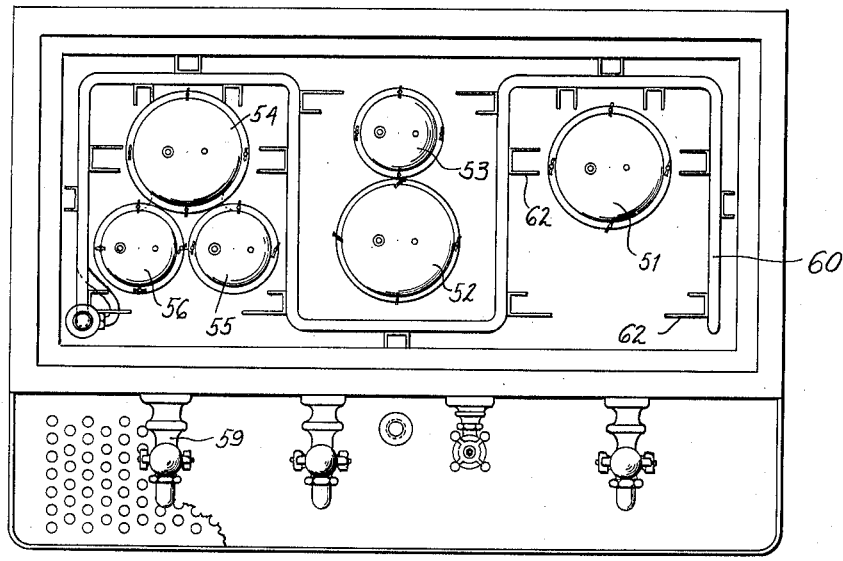
Fig. 4 is a plan view of a modification of my invention.

Referring to the drawings, particularly Fig. 1, I have indicated generally at 10 a beverage cooling cabinet such as is commonly employed for cooling and dispensing beer, and which may comprise an insulated front wall 11, an insulated rear wall 12, an insulated base 13, together with insulated side walls, and an insulated preferably removable top cover member 14. The construction and shape of the cabinet 10 constitutes no essential part of my invention and may be of any conventional design, properly insulated, and I contemplate that the after-described apparatus may replace the usual cracked ice or like refrigerant cooling means surrounding the beverage coils in such a cabinet.

The cabinet 10 has a vertically disposed coil, indicated at 15, mounted therein, and which may be of conventional design for a beverage coil adapted to transmit beverage through a cooling medium from a point of supply to the dispensing means. The coil illustrated is preferably formed of copper and has the lowermost convolution extended laterally and then vertically projected through the base 13 of the cabinet to connect with a beverage supply such as a beer barrel. To rigidly support and form a fluid seal for the coil portion projected through the base of the cabinet, a collar 16 may be provided. The uppermost convolution of the coil 15 is extended forwardly, as indicated at 17, to engage a threaded sleeve 18 of a conventional faucet or tap projected through an opening in the front wall 11 of the cabinet.

The parts thus far described are commonly used and constitute no essential part of my invention, sufficient pressure being exerted above the beverage level in the container, such as a barrel 20, to force beverage upwardly through the coil 15 under the control of the tap 19. Two or more such coils may be provided, as desired, controlled by a like number of taps; and a shelf such as indicated at 21, for holding glasses or the like to be filled, is normally provided at the front face of the cabinet.

Prior systems with which I am familiar have employed the parts thus far described, and fill the cabinet with cracked ice to cool beverage passing upwardly through the coil 15, or have employed automatic refrigeration, which is not sufficiently flexible in operation to accommodate the wide variations in amounts of beverage withdrawn, in addition to being relatively uneconomical. The ice-filled system has several obvious disadvantages, such as inflexibility of the cooling medium to accommodate wide fluctuations in beverage amounts passing through the coil in a given time, constant melting of the ice resulting in temperature fluctuation of the cooling medium, and the disadvantages attendant upon frequent replenishment and consequent exposure to the room temperature.

I have provided a unit commonly termed an evaporator, generally indicated at 22, for effecting cooling of beverage passing through the coil 15. The evaporator comprises a preferably continuous length of copper or the like tubing of high heat conductivity and formed to provide a plurality of inter-connected generally parallel tubes 23 lying in a common plane extending transversely of the cabinet, the tubes normally being in a vertical position, and one terminal tube such as 24 being connected with an expansion valve 25. The opposite terminal tube such as 26 is relatively short in length and is connected to a plurality, such as four, generally horizontally extending tubes 27 disposed thereabove and interconnected to form a continuous conduit.

A compressor or like means adapted to force a relatively low boiling point refrigerant liquid such as methyl chloride through the evaporator 22, is connected in circuit therewith whereby the liquid will be forced from the compressor through a conduit 28, the expansion valve 25, the vertically disposed inter-connected tubes 23, whereby the liquid will be volatilized in a manner to be later described, and returned in gaseous form to the compressor through the horizontally disposed tubes 27 and a conduit 26.

The tubes 23 are interconnected by a plurality of transversely extending generally U-shaped preferably copper fins 30 which are secured thereto in any suitable manner, as by soldering as indicated at 31, Fig. 3. Each fin 30 contacts each of the vertically extending tubes 23, the U web being of sufficient width to effect a considerable area of contact therebetween, and as best illustrated in Fig. 3, the U legs extend forwardly of the tubes a considerable distance presenting a relatively large horizontal surface utilized in a manner to be later described.

The fins 30 have the horizontally extending legs thereof preferably supported by means of a vertically disposed rod 32 which is secured in any suitable manner as by soldering to the fin ends. As best illustrated in Fig. 1, the fins 30 are extended intermediate the convolutions of the coil 15 substantially for the width thereof and contact the same, and since the fins have a high conduction value, they will absorb heat from the coil 15 and transmit the heat to the evaporator tubes 24.

The cabinet 10 is filled to a level sufficient to completely immerse the coil 15 and evaporator 22 with a liquid cooling medium such as calcium chloride and water, and which liquid possesses a relatively large heat absorption capacity, whereby it acts in a manner well understood as a stabilizing means maintaining a substantially constant temperature of the withdrawn beverage despite considerable fluctuations in the amount of beverage drawn in a given period.

To control the temperature of the cooling brine or the like solution in which the coil 15 and evaporator 22 are immersed, the flow of refrigerant medium through the evaporator is effected by means of a thermostatic switch 35 operable by a capillary tube provided with a thermostatic bulb 36 disposed in the cooling brine, the switch being responsive at adjustable predetermined high and low temperature limits to cut the compressor or the like in and out of operation and correspondingly control the flow of the refrigerant medium such as methyl chloride through the evaporator.

The thermostatic switch 35 is set to maintain a temperature of substantially 40° and the cooling brine surrounding the thermostatic bulb will therefore be maintained at this temperature but the lower levels of the brine solution will be maintained at progressively lower temperatures, and when cooling 6% beer the cooling brine adjacent the cabinet base will be maintained at a temperature of substantially 25° when the brine at the upper level is at a temperature of 40°. If it is desired to cool beverage such as 3% beer, which, due to the lesser volume of alcohol, will freeze at a temperature below 25°, relatively less calcium chloride or the like is placed in solution and the temperature of the cooling brine adjacent the cabinet base may thus be generally maintained at a relatively higher temperature such as 35° with the temperature at the upper fluid level maintained at 40°.

Thus, during operation of the system, the compressor or the like will be controlled in accordance with the temperature of the top portion of the cooling brine which as previously stated approximates 40° and the refrigerant medium such as methyl chloride will be pumped from the compressor under a pressure such as eighty pounds per square inch through a condenser where the compressed gas will be condensed with liquid and thence passed to the expansion valve 25 where the pressure will be reduced to a predetermined value such as fifteen pounds per square inch, this reduced pressure being controlled by adjustment of the expansion valve. As is well known, irrespective of the amount of liquid in a closed system, a definite temperature will exist in correspondence with a definite vapor pressure and by controlling the pressure in the system, the temperature may be controlled. In the present instance, the pressure is controlled so as to effect a temperature approximating 20°.

The tubes 23, which contain the refrigerant medium such as methyl chloride, are surrounded by relatively warmer cooling brine and extract heat therefrom resulting in expansion of the refrigerant medium to a gaseous state; and this expansion takes place in each of the vertically disposed tubes 23. The lower portion of the tubes such as the lower fourth is filled with liquid resulting in what is commonly termed semi-flooded operation of the evaporator. Obviously, the greatest absorption of heat by the methyl chloride or like refrigerant medium and consequently the maximum cooling effect will be at the liquid level of the refrigerant medium in the tubes 23.

The temperature of the lower portion of the cooling brine will approximate that of the methyl chloride or the like which is substantially 20° and consequently the lower portion of the cooling brine is maintained at substantially 25°; and since the methyl chloride in gaseous form has relatively little heat exchange value, the upper portion of the cooling brine is considerably warmer than the lower portion.

Due to the rapidity with which heat is conducted from the beverage coil 15 to the cooling brine and the evaporator tubes 23 and the well known qualities of a cooling brine such as calcium chloride and water in absorbing a considerable amount of heat with a relatively small temperature fluctuation, the beverage entering the cabinet is rapidly cooled with the major portion of the cooling being effected in the lowermost portion of the cabinet.

Thus, the rapidity of circulation of the refrigerant medium through the evaporator is controlled responsive preferably to temperature at the top portion of the cabinet and the heat absorption by the refrigerant medium is sufficient to maintain the temperature of the cooling brine in the lowermost portion of the cabinet 5 to 15° lower than the temperature at the brine surface.

The fins 30 of the evaporator, in addition to serving as a heat conducting medium, achieve another important function in effecting a circulation of the cooling brine since the brine in contact with the fins is rapidly cooled and is replaced by relatively warmer brine, insuring a circulation of the brine surrounding the beverage coil 15.

I have found that if a desired temperature, such as 40°, is maintained at the liquid level, that a temperature of 25° may be obtained at the cabinet base with corresponding intermediate temperatures. Thus, the beverage at the point of entrance into the cooling cabinet 10 encounters the coolest portion of the brine or the like having the greatest heat exchange value, whereby the beverage passing through the coil 15 may be more rapidly cooled than if a constant temperature such as 40° were maintained throughout the brine.

The temperature at the brine level, being substantially at the desired withdrawal temperature of the beverage, acts as a balance in the event that the beverage passing through the lower portion of the coil should become unduly cooled and raises the temperature of the beverage substantially to that of the brine level.

I have found by experiment that sixty-five to seventy ten-ounce glasses of beer may be drawn with the tap continuously open and that the temperature difference between the first glass drawn and the last glass drawn will be substantially 2°. Also, if no beer is withdrawn for a substantial period, the initial beer drawn will be at a desired temperature, such as 40°, since this is the temperature of the top convolutions of the coil 15 in which the initially withdrawn beer would be stored.

Due to the relatively large volume of cooling brine, considerable volume of beverage passing through the coil 15 may be cooled without any substantial rise in temperature of the cooling brine, thereby permitting use of the apparatus for a period such as one to three hours, in the event of a break-down of the power circuit operating the compressor or the like.

The self-circulation of the cooling brine, effected as previously explained, eliminates the necessity of a circulating pump system for the brine, resulting in very economical operation.

The horizontally disposed tubes 27 permit slugs of the refrigerant liquid such as methyl chloride carried upwardly by the expanded refrigerant gas in the vertically disposed tubes 23 to be expanded prior to returning to the compressor thereby insuring that the refrigerating effect of the methyl chloride or the like will be utilized entirely within the evaporator.

The modification illustrated in Figs. 4 and 5 employs an insulated cabinet 50 generally similar to the cabinet 10 described in connection with the embodiment of Figs. 1 to 4 but wherein a tank or a plurailty of tanks rather than coils are utilized for transmitting the beverage through the liquid cooling medium.

The beverage tank system hereinafter briefly described is well known and constitutes no essential part of my invention. This system may comprise a single tank as indicated at 51 supported upon the floor of the cabinet, the beer or the like being forced thereinto under pressure from a supply container disposed externally of the cabinet, two tanks as indicated at 52 and 53, or three tanks as indicated at 54, 55, and 56.

The aforementioned tanks are preferably provided with a plurality of internal baffles to insure a circulation of the beverage within the tank, the beverage preferably entering the tank substantially midway thereof vertically, the point of entrance of the beverage into the tank 56 being indicated at 57, and the withdrawal line for cooled beverage leaving the tank being indicated at 58.

The line 58 connects with the usual tap or faucet, as indicated at 59.

Where a plurality of tanks are used the tanks are connected in series in a similar manner, that is, the beverage entering the tank substantially at the mid-vertical point and leaving the tank adjacent the base, each of the tanks being partially filled with liquid beverage, and the gas pressure above the liquid level in each tank being sufficient to force the beverage through the tap upon opening of the same. Pressure release valves and pressure check valves may be provided for each tank, if desired.

Figure 5:
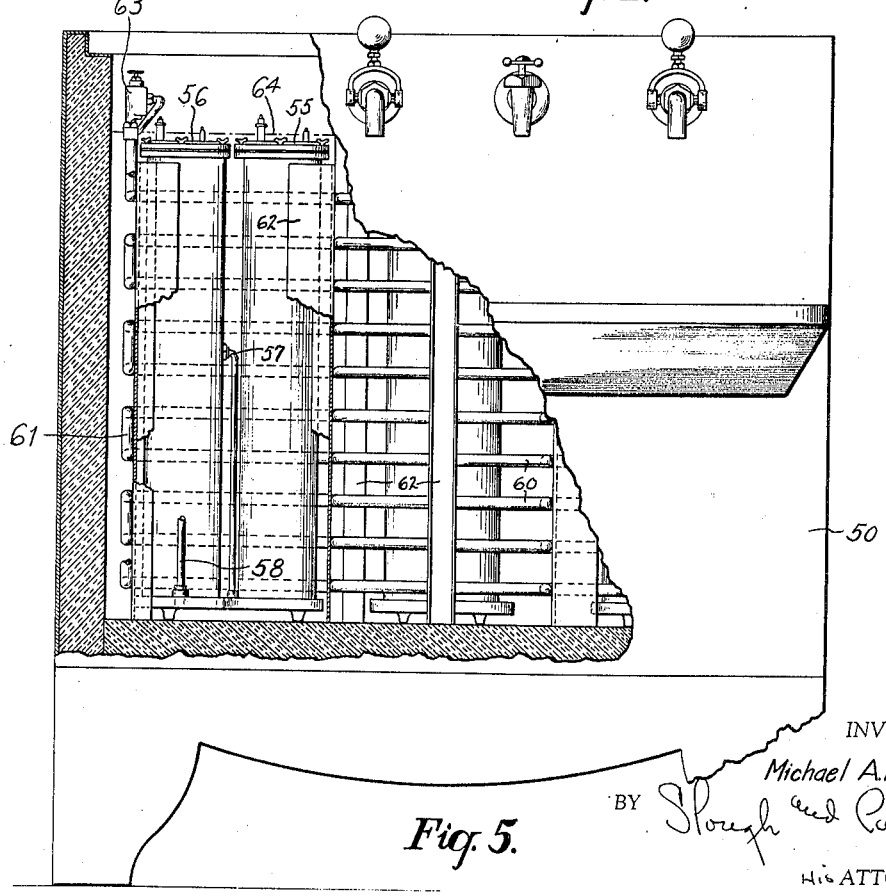
Fig. 5 is an elevational view of the modification shown at Fig. 4 with the front wall of the cabinet partially broken away.

The cooling coil comprises continuous tubing 60 bent to provide a series of horizontally disposed and vertically spaced coils generally in the form of reversely connected U-formations, as best illustrated in Fig. 4. The said horizontally disposed U-shaped coils are interconnected by vertical coil portions 61 to form a continuous cooling conduit surrounding the aforementioned tanks.

The tubing 60 is maintained in the desired shape by means of a plurality of vertically disposed preferably copper fins 62 secured to the tubing in any suitable manner, as by soldering. The cooling or refrigerant fluid traversing the tubing 60 will be controlled in a manner similar to that previously described in connection with the embodiments of Figs. 1 to 3, wherein the refrigerant fluid will be forced from the compressor or the like through the lowermost coils and thence upwardly and passing through an expansion or compensator valve 63 prior to being returned to the compressor in a substantially gaseous state. The purpose and operation of the valve 63 is the same as the valve 25 previously described.

The cabinet 50 is filled to a level such as indicated at 64, with water, providing a volume of liquid having a relatively great heat exchange capacity, thereby maintaining the cooling effect on the beverage substantially constant despite fluctuations in the rate of passage of the beverage through the cooling tanks.

The fins 62 have a high heat conduction value and quickly dissipate the heat transmitted to the water closely surrounding the tanks in the main body of water, effecting a continuous circulation and insuring an even distribution of the heat extracted from the beverage to the cooling coils or tubing 60.

A thermostatic control 35, as previously described, may be utilized to control the operation of the compressor responsive to the temperature of the water in the cabinet in a well known manner. Due to the volume of the beverage contained in the tanks and the rapid dissipation of heat effected by the cooling coils encircling the tanks, in combination with the high heat conductivity fins, the beverage may be withdrawn at a relatively rapid rate without any substantial change in the desired temperature at withdrawal, and due to the uniformity of temperature of the water surrounding the tanks, the temperature of the beverage withdrawn after a period of nonoperation will not vary to any appreciable degree from that during periods of relatively rapid operation.

Although I have shown and described certain modifications of my invention, I contemplate that numerous and extensive departures may be made therefrom without departing from the spirit of my invention and the scope of the appended claims.

Having thus described my invention, what I claim is:

1. In a beverage cooling apparatus, a heat insulated cabinet adapted to contain a cooling liquid of low freezing point, a vertically disposed beverage coil terminating upwardly below the liquid level and adapted to have beverage circulated therethrough from an external source of supply to an outlet adjacent the cabinet top, a refrigerant fluid conduit disposed beneath the liquid level in the cabinet and adapted to have a volatile refrigerant fluid circulated therethrough, high heat conductivity means in the cabinet interconnecting the beverage coil and the refrigerant fluid conduit comprising fins engaging the refrigerant conduit projecting outwardly therefrom intermediate the coil convolutions, and temperature responsive means adjustable externally of the cabinet controlling refrigerant fluid flow through the conduit.

2. In a beverage cooling apparatus, a heat insulated cabinet, a generally vertically disposed beverage coil in the cabinet adapted to be connected to a beverage supply at one end and a faucet at the other end, a plurality of generally vertically disposed interconnected tubes adjacent said coil adapted to have a volatile refrigerant fluid circulated therethrough, a plurality of fins of high heat conductivity contacting said tubes and projected intermediate and engaging the coil convolutions, both the coil and tubes being formed of high heat conduction material whereby heat will be readily transferred therebetween by said fins, the cabinet being adapted to contain a cooling liquid of low freezing point of a depth to completely immerse said coil and tubes, and the tubes being adapted to be connected in circuit with a compressor or the like externally of the cabinet.

3. A heat exchange unit for inclusion in a volatile fluid type refrigerant system including a compressor and a coiled tube adapted to transmit therethrough a liquid to be cooled, said unit comprising a continuous conduit bent to form a plurality of generally parallel vertically disposed tubes interconnected by generally parallel transversely extending individual fins of high heat conductivity projecting a substantial distance outwardly from the conduit, the fins being channel-shaped in cross section with the channel web abutting and rigidly secured to each of the tubes and the channel legs extending outwardly from the plane of the tubes whereby they may project intermediate the convolutions of the coiled tube for a substantial distance, the conduit being adapted to have refrigerant circulated therethrough, and a discharging portion of the conduit extending horizontally a substantial distance whereby liquid refrigerant may volatilize prior to returning to the compressor.

MICHAEL A. MARTIN.